(12) United States Patent
Fryk et al.

(10) Patent No.: US 6,309,012 B1
(45) Date of Patent: Oct. 30, 2001

(54) ONE PIECE MOLDED ROOF FOR A VEHICLE CAB

(75) Inventors: Bruce Kevin Fryk, Waverly; Dean Arden Boyce; Shawn Michael Bartz, both of Waterloo, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/550,822

(22) Filed: Apr. 18, 2000

(51) Int. Cl.⁷ ............................. B62D 25/06; B60R 27/00
(52) U.S. Cl. .................. 296/211; 296/102; 296/208; 296/210; 296/190.09
(58) Field of Search ............................. 296/190.09, 211, 296/210, 102, 208

(56) References Cited

U.S. PATENT DOCUMENTS

| | | | |
|---|---|---|---|
| 2,817,281 | * 12/1957 | Schwan et al. ........................ 98/1 |
| 3,532,377 | * 10/1970 | Grasseler ............................ 296/28 |
| 3,841,430 | * 10/1974 | Babbitt, Jr. et al. ................ 180/89 |
| 4,088,364 | * 5/1978 | Termont ............................ 296/28 |
| 4,097,085 | * 6/1978 | Nelson ............................. 296/28 |
| 4,120,527 | * 10/1978 | Lawrence .......................... 296/28 |
| 4,133,574 | * 1/1979 | Martin ............................. 296/28 |
| 4,503,749 | 3/1985 | Kuhn et al. . |
| 4,658,598 | 4/1987 | Schulz . |
| 4,660,462 | 4/1987 | Thompson et al. . |
| 4,721,031 | * 1/1988 | Nakata et al. .................... 98/2.09 |
| 4,739,853 | * 4/1988 | Ogilvie .......................... 180/89.12 |
| 5,690,549 | 11/1997 | Webb et al. . |
| 5,906,411 | * 5/1999 | Stauffer et al. ................ 296/190.11 |
| 5,921,619 | 7/1999 | Cederberg et al. . |

* cited by examiner

*Primary Examiner*—Joseph D. Pape
*Assistant Examiner*—Greg Blankenship

(57) ABSTRACT

A one piece rotational molded roof for a vehicle cab is provided in which separate inlet and outlet air ducts are molded in the roof. The ducts are formed by molding upper and lower panels that are widely spaced to form the ducts and which are closely spaced about the periphery of the ducts. After a solid surface layer is molded, a second resin charge containing a foaming agent is dropped in the mold. This resin coats interior of the solid surface layer and later foams. The foam expands and extends completely between the closely spaced upper and lower panels of the solid surface layer to seal between the inlet and outlet air ducts. The foam is rigid to strengthen the roof.

13 Claims, 3 Drawing Sheets

FIG. 1

ONE PIECE MOLDED ROOF FOR A VEHICLE CAB

BACKGROUND OF THE INVENTION

1. Field of the Invention

The present invention relates to a one piece plastic molded hollow roof for a vehicle cab and in particular to a roof having integrally molded and separated inlet and outlet air ducts within the hollow roof.

2. Description of Related Art

U.S. Pat. No. 5,690,549 discloses a roof for a vehicle cab that comprises a hollow plastic body molded in one piece and defining a cavity therein. The body includes an inner partition wall extending between the upper roof surface and the lower roof surface to define a well bounded by the partition wall. The partition wall separates the well from the cavity of the hollow body. The entire cavity within the hollow body serves as an inlet air duct having one or more inlets. A blower mounted in an aperture in the partition wall draws air into the cavity. The blower draws air into the well which houses a heater core and an air evaporator coil. From the well, the air is discharged downward, into the interior of the vehicle cab. This structure uses the entire cavity of the hollow roof as a single inlet air duct. The air outlets are limited to the well area and the well is limited to the regions in the roof having sufficient space to package the heater core and evaporator coil. These may not be optimum locations for the air outlets.

SUMMARY OF THE INVENTION

The present invention overcomes the above disadvantages by providing the one piece plastic molded hollow body roof with multiple interior cavities sealed from one another, forming at least one inlet air duct and at least one outlet air duct. The ducts are sealed from one another to prevent air from flowing between the ducts. By providing separate inlet air ducts and outlet air ducts, the location of the outlet openings is not dictated by the location of the chamber containing the heater core and evaporator coil. The outlet locations can be better optimized for operator comfort.

The roof is rotationally molded. A first charge of resin forms the outer solid surface layers of the hollow body. The solid surface layers generally in the form of upper and lower panels that are spaced from one another to create a single cavity within the hollow body. The upper and lower panels are widely spaced in regions of the roof that form the air ducts and are closely spaced in regions of the roof about the periphery of the air ducts. After the outer surface layer is molded, additional resin is dumped into the interior of the hollow body. This additional resin contains a foaming agent. During the rotational molding process, the second resin charge coats the interior of the outer solid surface layer. Once the second resin charge reaches a predetermined temperature, the foaming agent is activated, causing the resin to foam and expand. In those regions where the upper and lower panels are closely spaced, the foam will expand to completely fill the void between the solid surface layers, bonding the layers to one another. The foam structure seals the air ducts from one another.

The foam is preferably rigid to add strength to the plastic molded hollow body. The foam also provides acoustic and thermal insulation. Bonding the upper and lower panels to one another at numerous locations in the roof further strengthens the roof.

The roof of the present invention is formed with an open chamber, preferably open from above. The open chamber houses the heater core and evaporator coil. A blower is provided between the open chamber and each outlet duct. The blower forces air into the associated outlet air duct for discharge into the interior of the cab. The blowers produce a reduced pressure in the chamber, drawing air through the inlet air ducts into the open chamber. The inlet air ducts have air inlets located inside and/or outside of the cab for recirculating air or for drawing in fresh air from outside the cab. The open chamber allows the heater core, evaporator coil, blowers and other mechanical components to be easily mounted to the roof. After these components are installed, a cover is placed over the chamber opening to close the chamber.

Rotational molding with a foam core is the preferred method for making the roof of the present invention. The roof can by made by twin sheet thermoforming or by SMC panels molded together at seams about the inlet and outlet air ducts to seal the ducts from one another.

DESCRIPTION OF THE DRAWINGS

FIG. 1 is a top view of the roof of the present invention.

DESCRIPTION OF THE PREFERRED EMBODIMENT

Figure 1:
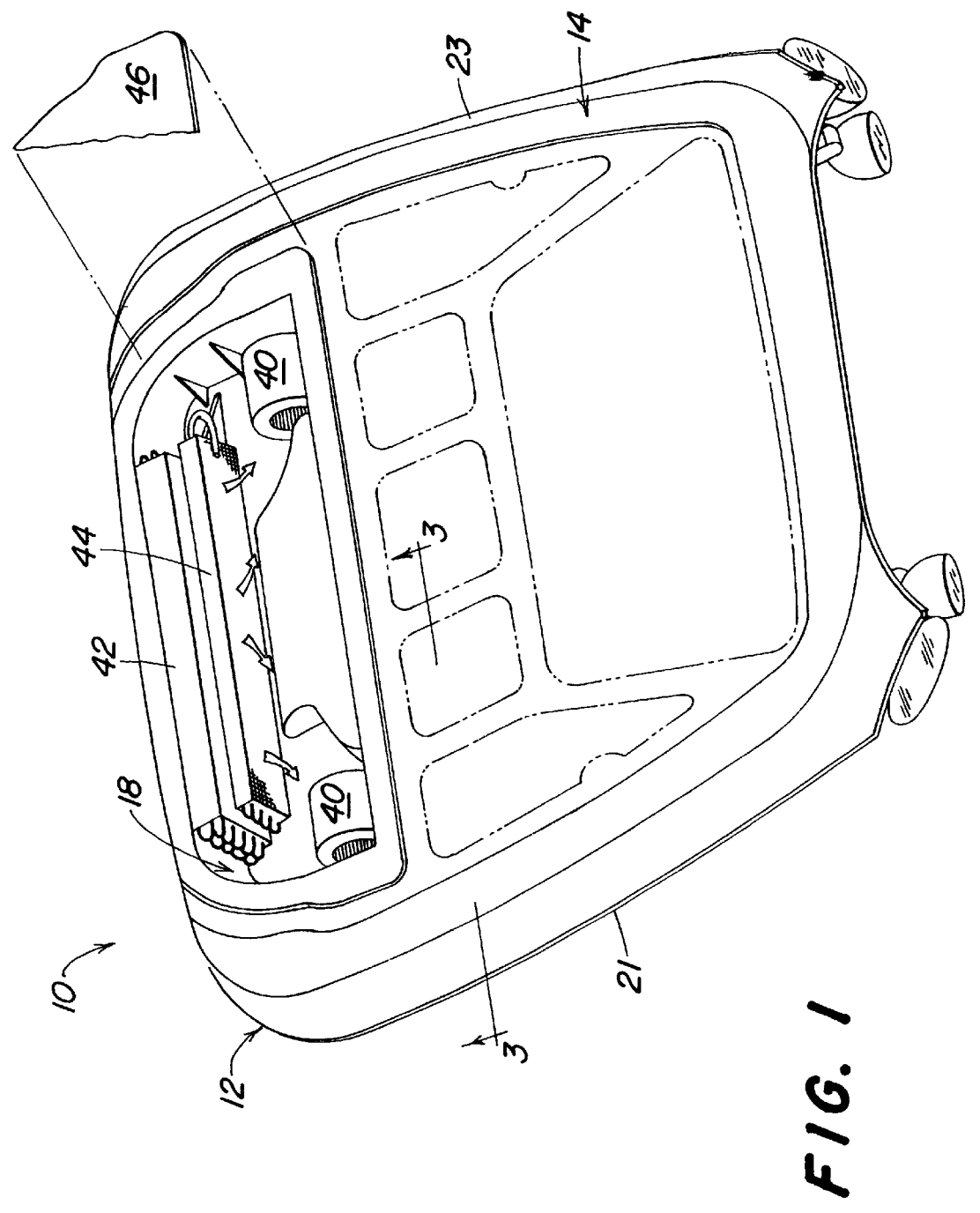
Figure 2:
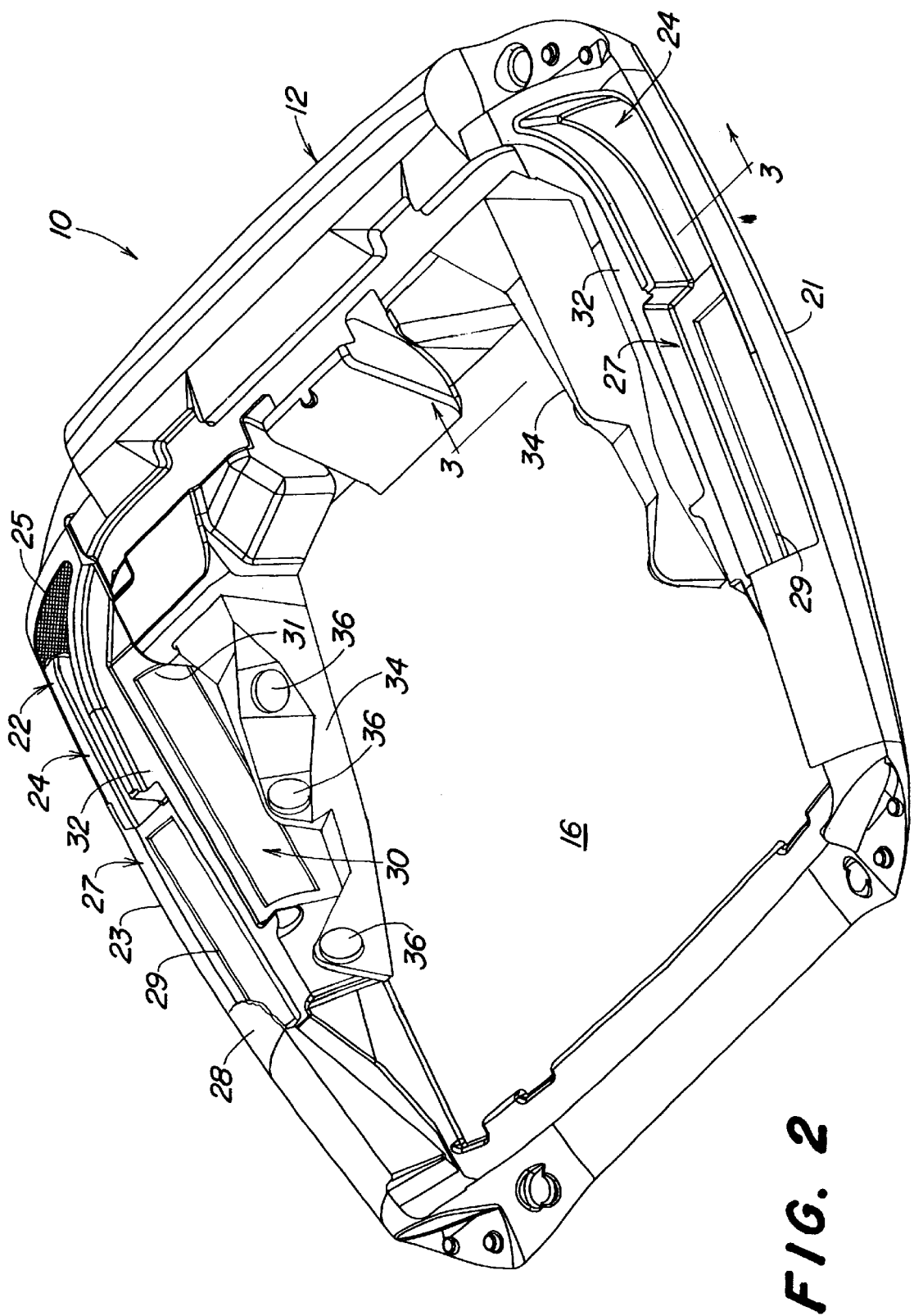
FIG. 2 is a bottom view of the roof of the present invention.

The vehicle roof of the present invention is shown in FIG. 1 and designated generally as 10. The roof 10 includes a single one-piece plastic molded hollow body 12 that is preferably formed by a rotational molding process. The hollow body 12 is a single piece molding, and, due to its shape, it can be described generally as having an upper panel 14 shown in FIG. 1 forming the upper surface and a lower panel 16 shown in FIG. 2 forming the lower surface. The upper and lower panels are joined at the periphery of the roof and at several locations throughout the roof as described below.

The body 12 is molded with an open chamber 18 formed near the rear of the mounting. The chamber 18 is open from above and formed by a recess in the upper panel 14 where the upper panel is recessed downward toward the lower panel 16.

The hollow body 12 is formed with multiple cavities that are sealed from one another to form inlet and outlet air ducts within the hollow body 12. Inlet air ducts 20 are formed along the right and left lateral sides 21, 23 of the roof. The inlet air ducts 20 are generally identical on each side of the roof. The inlet air ducts have both a fresh air inlet 22 and a recirculation air inlet 30. The fresh air inlet begins with an upwardly projecting recess 24 formed in the lower panel 16. A louvered grill 25 covers the recess 24. Air flows forward from the recess 24 into a larger recess 27 that is covered by a removable access panel 28 (FIG. 2). From there, the air moves upward, through an opening 29 in the lower panel 16 that carries an air filter, not shown. Once air flows through the filter, it enters the inlet air duct 20 formed between the upper and lower panels. The inlet air duct extends rearward above the recesses 27 and 24 and extends behind the open chamber 18. An opening along the rear of the open chamber allows air to flow into the chamber 18. The lower panel 16 also has an opening 31 that forms the recirculation inlet 30 into the inlet air duct 20. A recirculation air filter (not shown) is disposed in the opening 31. The flat portion 32 of the lower panel 16 rests upon the upper surface of the vehicle cab roll over protective structure 33 at the upper end of the cab side wall 35. The portion of the roof forming the recess 24 forms a lateral overhanging portion extending outward beyond the side wall 35 of the vehicle cab.

The air passage from the louvered grill to the open chamber 18 is arranged with the inlet grill at the rear corners of the roof because the air is generally cleaner there than at other areas under the roof. The air passage has a first lower portion that extends forward from the grill to locate the air filter closer to the steps to the cab (not shown) where the filter can be easily reached for changing. The access panel 28 is made removable for the purpose of changing the filter. Past the filter, the air passage then extends rearward through the molded duct 20, forming a second raised portion, to the rear of the open chamber 18. The second raised portion is above the first lower portion of the passage defined by the recesses 24 and 27 in the lower panel 16.

Outlet air ducts 34 extend forward from the open chamber 18 generally parallel to the inlet air ducts 20. The outlet air ducts have one or more outlets 36 through which air is discharged into the interior of the vehicle cab. A blower 40 is placed between the chamber 18 and each of the outlet air ducts 34 to draw air from within the chamber 18 and into the ducts 34, where the air is discharged through the outlets 36 and into the vehicle cab. The blowers also produce a reduced pressure within the chamber 18 and the inlet air ducts 20 to draw air through the inlet air ducts into the open chamber 18.

An air conditioning evaporator coil 42 is placed in the chamber 18 immediately in front of the opening from the inlet air ducts. Immediately forward of the evaporator coil is a heater core 44. Air drawn into the chamber 18 by the blowers 40 must pass through the evaporator coil 42 and heater core 44 for proper temperature conditioning of the air prior to discharge into the vehicle cab. The chamber 18 is opened from above to provide access for installation and maintenance of the evaporator coil, heater core, blowers and associated mechanical equipment. Once assembled, a cover member 46 is placed over the top of the open chamber to close and seal the chamber.

Figure 3:
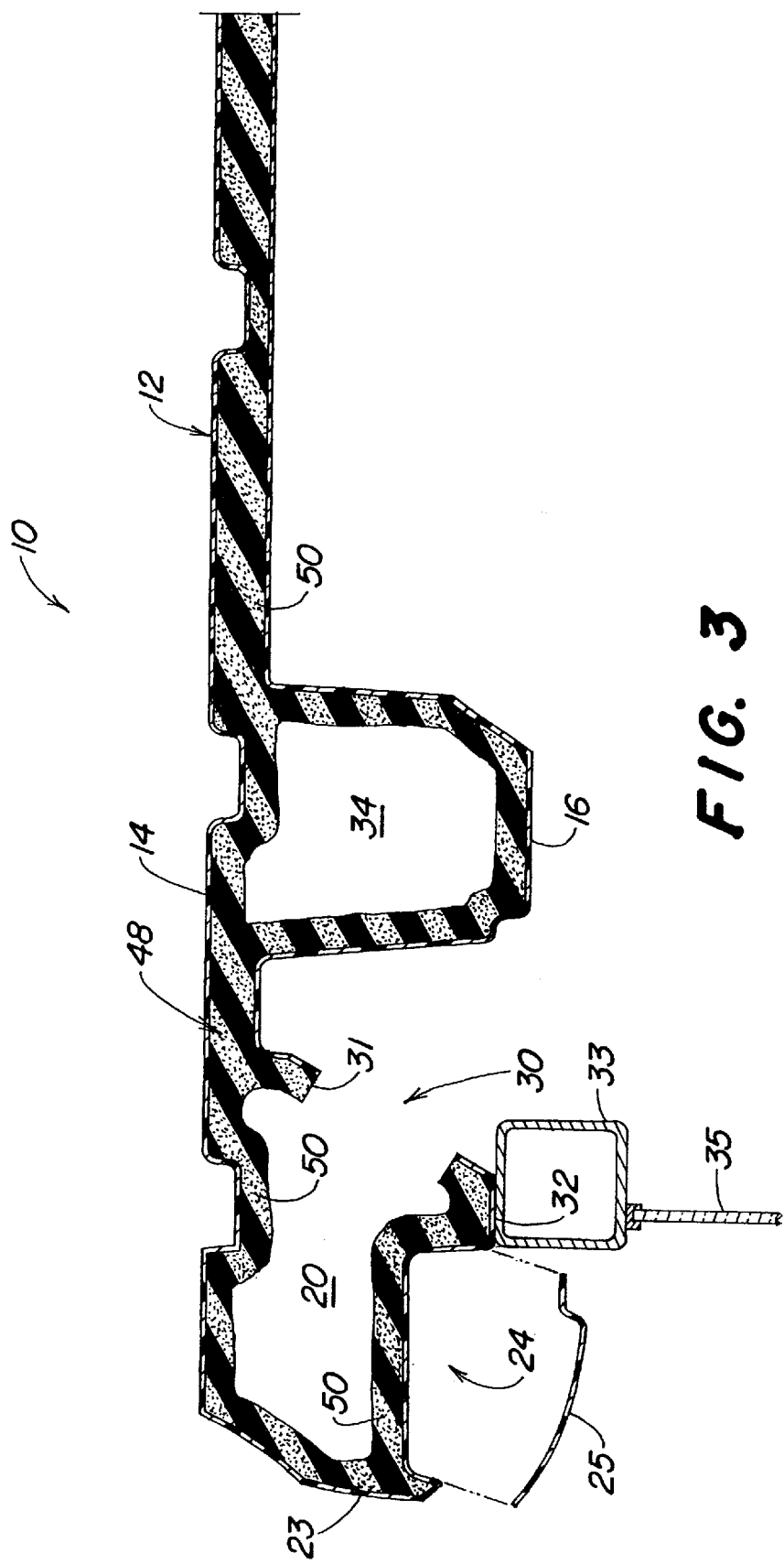
FIG. 3 is a sectional view of the roof of the present invention as seen from line 3—3 of FIGS. 1 and 2.

With reference to FIG. 3, the internal structure of the plastic hollow body 12 is shown in greater detail. The air ducts 20 and 34 are formed in regions of the roof where the upper and lower panels 14, 16 are widely spaced from one another. The upper panel 14 and lower panel 16 are closely spaced in regions about the periphery of the ducts 20 and 34, such as the region 48 between the ducts. The upper and lower panels are formed by rotationally molding a solid surface layer from a first charge of resin in a rotational mold cavity. After the solid surface layer is molded forming a hollow body, a second charge of resin is discharged into the interior of the hollow body while the hollow body remains in the rotational mold. This second charge of resin contains a foaming agent. The second charge will first melt and completely coat the inner surface of the solid surface layer. Once the second charge of resin reaches a predetermined temperature, the foaming agent is activated and a layer of foam 50 will be formed on the interior of the solid surface layer. In the regions where the solid surface layers are closely spaced to one another, such as the region 48, the foam layer 50 will span completely between the solid surface layers. This creates a seal between the adjacent air ducts, preventing air flow therebetween. The foam has an inner skin that prevents air from seeping through the foam. The foam is preferably rigid to add stiffness to the hollow body 12. In addition, the joining of the upper and lower panels to one another at various locations adds to the stiffness of the roof structure. In the preferred embodiment, both the solid surface layer and the foam layer are molded of polyethylene.

The roof of the present invention utilizes the inner foam layer to seal separate cavities in the roof to form inlet and outlet air ducts. This enables the air outlets to be located at various positions in the roof to better optimize the air conditioner and heater performance. A headliner will be installed on the lower panel 16 that may provide covers for the inlet and outlet openings and an esthetically pleasing interior surface. If desired, a cover panel may cover the upper panel 14.

The invention should not be limited by the above-described embodiment, but should be limited solely by the claims that follow.

We claim:

1. A roof for a cab of a vehicle comprising a one piece molded plastic hollow body defining an externally open chamber and multiple interior cavities, at least one of the cavities forming an inlet air duct extending between the open chamber and at least one inlet opening for air flow through the inlet air duct to the chamber and at least one of the cavities forming an outlet air duct extending between the open chamber and at least one outlet for air flow from the open chamber through the outlet duct and outlet.

2. The roof as defined by claim 1 further comprising:
  a blower mounted to the hollow body for drawing air through the at least one inlet air duct into the open chamber and for discharging the air through the outlet air duct;
  at least one heat exchanger in the open chamber through which air flowing through the chamber passes; and
  a cover member closing the externally open chamber.

3. The roof as defined by claim 1 wherein the at least one inlet air duct and the at least one outlet air duct are sealed from one another to prevent air flow therebetween.

4. The roof as defined by claim 1 wherein the at least one inlet air duct includes a fresh air inlet opening for drawing air from outside of the cab and a recirculation air inlet opening for drawing air from within the cab.

5. The roof as defined by claim 2 wherein the blower is disposed between the chamber and the at least one outlet air duct.

6. The roof as defined by claim 1 wherein the at least one outlet air duct includes two separate outlet air ducts extending from the chamber, each outlet air duct having an air outlet and further comprising two blowers, with one of the blowers associated with each outlet air duct.

7. The roof as defined by claim 1 wherein the hollow body includes a solid surface layer forming upper and lower panels with the upper and lower panels being joined to one another at multiple locations by a rigid foam.

8. The roof as defined by claim 7 wherein the rigid foam forms a seal between the at least one inlet air duct and the at least one outlet air duct.

9. A roof for a cab of a vehicle the roof comprising:
  a one piece molded plastic hollow body defining an externally open chamber in a rear portion of the hollow body and multiple interior cavities, at least two of the cavities forming inlet air ducts extending fore and aft of the hollow body along laterally outward edges of the hollow body between the open chamber and an inlet opening for air flow through the inlet air duct to the open chamber and at least two of the cavities forming outlet air ducts extending fore and aft of the hollow body laterally inward of the inlet air ducts between the open chamber and at least one outlet for air flow from the open chamber through the outlet ducts and outlets;

a pair of blowers with one blower between the chamber and each outlet air duct for drawing air through the inlet air duct into the chamber and for discharging the air through the associated outlet air duct;

at least one heat exchanger in the chamber through which air flowing through the chamber passes; and a cover member closing the externally open chamber.

10. The roof as defined by claim 9 wherein the inlet air ducts and the outlet air ducts are sealed from one another thereby preventing air flow therebetween.

11. The roof as defined by claim 9 wherein the hollow body includes a solid surface layer forming upper and lower panels with the upper and lower panels being joined to one another at multiple locations by a rigid foam.

12. The roof as defined by claim 11 wherein the rigid foam forms a seal between the inlet air ducts and the outlet air ducts.

13. A roof for a vehicle cab having a side wall, the roof comprising a hollow body adapted to be placed on top of the cab side wall with a lateral overhang portion adapted to extend laterally outward beyond the cab side wall and having a lower surface;

an inlet air passage in the roof having a first lower portion and a second raised portion within the overhang portion of the roof;

the first lower portion beginning at an air inlet in the lower surface of the lateral overhang adjacent a rear corner of the roof with the first lower portion; and then extending upward to the second raised portion of the inlet air passage; and the second portion of the inlet air passage then extending rearward over the first lower portion of the inlet air passage to the rear of the roof.

* * * * *